United States Patent Office 2,969,344
Patented Jan. 24, 1961

2,969,344

PROCESS FOR PREPARING POLYPROPYLENE

Ernest W. Dobson, Media, and Thomas J. Kelly, Philadelphia, Pa., assignors to Sun Oil Company, Philadelphia, Pa., a corporation of New Jersey No Drawing. Filed Aug. 8, 1957, Ser. No. 676,948

2 Claims. (Cl. 260—93.7)

This invention relates to a new process for the preparation of relatively high molecular weight polymers of propylene, and more particularly relates to a process for the preparation of solid, crystalline polymers of propylene.

Propylene has heretofore been polymerized to high molecular weight solid polymers. A catalyst which is especially effective for this polymerization is the combination of a lower halide of titanium, such as titanium trichloride, and an aluminum trialkyl, such as aluminum triethyl. This catalyst can be prepared by admixing, for example, titanium tetrachloride and aluminum triethyl in an inert solvent such as isooctane. On admixing the two components, a finely divided solid phase is formed as a dispersion in the inert solvent. This dispersion acts as a catalyst for polymerizing propylene to solid polymers. If desired, a lower halide such as titanium trichloride can be preformed, dispersed in an inert liquid, and an activator such as an aluminum trialkyl added. The solid phase acts as a catalyst for polymerizing propylene to solid polymers. In performing the polymerization step, propylene is contacted with the solid catalyst, such as by passing the olefin into a suspension of the finely divided solid in the inert liquid reaction medium under polymerizing conditions. Other materials can be substituted for the titanium trichloride and/or aluminum triethyl, as hereinafter described. Anhydrous and oxygen-free conditions are used throughout the process, since the catalyst is deactivated by contact with water or oxygen.

After the polymerization reaction is complete, or has proceeded to a desired extent, a catalyst deactivating material such as water or an alcohol is added to the reaction mixture and the mixture is agitated preferably by means which comminute the polymer so that catalyst particles embedded in the polymer are exposed to the deactivant. In order to remove the inorganic catalyst, or the inorganic particles from catalyst deactivation, a strong inorganic acid such as nitric acid is advantageously mixed with the water or alcohol deactivant, or contacting with an acid solution can follow a catalyst deactivating step. The solid polymer is then separated from the liquid, and is washed and dried.

Generally processes as above described produce polymers having molecular weights of above about 5,000 and usually within the range of from about 50,000 to 300,000. A proportion of the solid product obtained with the mentioned catalyst is crystalline, i.e., exhibits a crystalline structure by X-ray analysis, while the remainder of the solid product is amorphous. The crystalline polymer is relatively insoluble in hydrocarbon solvents, such as the paraffins, including for example, the pentanes, hexanes, octanes, decanes, and the like, whereas the amorphous polymer is relatively soluble in such hydrocarbons. Both the crystalline and amorphous polymers are substantially insoluble in polar materials, such as alcohols, aldehydes and ketones, and such polar materials are herein designated as "antisolvents." The insolubility of the crystalline polymer in hydrocarbon solvents provides a means for the separation thereof from the amorphous polymers. This separation is valuable because the crystalline polymer possesses many desirable properties, such as high melting point, tensile strength, and the like, which are not possessed by the amorphous polymer and which are deleteriously affected by the presence of the amorphous polymer. However, use of the different solubilities for separating crystalline polypropylene from amorphous polymers of propylene is difficult because solvents for the amorphous polymer cause swelling of the crystalline polymer so that it appears as a gelatinous mass. This swelling makes separation such as by filtration difficult and time consuming, and results in inefficient separations, i.e., a substantial amount of the amorphous polymer remains with the swollen crystalline polymer.

An object of the present invention is to provide a process for the preparation of crystalline polymers of propylene. A specific object of the invention is to provide for the preparation of crystalline polypropylene substantially free from amorphous polymers of propylene. Other objects and their achievement in accordance with the process of the invention will be apparent hereinafter.

It has now been found that by contacting a mixture of crystalline and amorphous polypropylene with a solvent for the amorphous polymer in which has been incorporated a critical amount of an anti-solvent, the amorphous polymer is rapidly dissolved whereas the crystalline polymer is unaffected, i.e., the crystalline polymer does not dissolve and does not swell. The solid crystalline polymer is readily separated such as by filtration from the solution of amorphous polymer in the mixture of solvent and anti-solvent.

In accordance with an embodiment of the process, propylene is contacted with a dispersion of a solid catalytic material maintained in an inert, liquid reaction medium. After the polymerization reaction, a catalyst deactivating material such as an aqueous solution of nitric acid is added to the reaction mixture with agitation. The agitation is continued until the aqueous acid solution has dissolved at least a major proportion of the catalytic components. The aqueous acid solution is then drained and the mixture of solid crystalline and amorphous polymers washed with n-pentane at a relatively low temperature so that the polymers are not dissolved therein. The resulting mixture of crystalline and amorphous polymers is then contacted with a solvent for the amorphous polymers, such as isooctane, having admixed therewith from 0.02 to 0.6 part by volume of an anti-solvent, such as acetone, at a temperature of about 30° C. The amorphous polymers are rapidly dissolved whereas the crystalline polymers are substantially unaffected, i.e., the crystalline polymers are not dissolved and do not swell. The crystalline polymers are then separated by filtration, washed with isooctane, and dried. The resulting crystalline is substantially free of amorphous polymer and exhibits enhanced properties.

The mixture of crystalline and amorphous polypropylene which is separated in accordance with the process of the invention is prepared by polymerizing propylene with a solid catalyst maintained as a dispersion in an inert, liquid diluent, such as n-heptane, isooctane or a mixture of paraffinic hydrocarbons. The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride is preferred, as above described. The metal halide is used with an activator therefor such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 0° C. to 150° C. are suitable. Atmospheric pressure is preferably used although elevated pressures can be used to advantage in that the polymerization reaction proceeds at a faster rate at such elevated pressures, say up to about 10,000 p.s.i.g. (pounds per square inch gauge). The catalyst is deactivated and removed by adding water, alcohol or an aqueous or alcoholic solution of an inorganic acid, such as nitric acid, to the polymerization system with vigorous agitation. Preferably such agitation provides for comminuting the catalyst during the contacting with the catalyst deactivating liquid. The polymer is then repeatedly washed to remove at least a major proportion of the residual inorganic material from the catalyst, and is drained. Such catalyst deactivants, in the amounts required for effective catalyst deactivation, cause precipitation of any amorphous polypropylene which may be dissolved in the inert, liquid reaction medium, so that the process yields a product which is a mixture of crystalline and amorphous polypropylene. The amorphous polymer is removed, in accordance with the invention, so that crystalline polypropylene substantially free of amorphous polymers is obtained.

In accordance with the present invention, a mixture of crystalline and amorphous polypropylene, such as is prepared as above described, is contacted with a mixture of a solvent for the amorphous polymer containing a critical amount of an anti-solvent. Although aromatic hydrocarbons cause severe swelling of the crystalline polymer, in the presence of an anti-solvent, as hereindescribed, the hydrocarbon solvent used can contain substantial proportions of aromatic hydrocarbons, say up to about 40% by weight, without deleterious results. The presence of such amounts of aromatics is sometimes desirable in order to increase the solubility of the anti-solvent in the solvent. Aromatics such as benzene, toluene, the xylenes, and the like, for example, can be used in quantities of from about 5% to 30% by weight of the paraffinic hydrocarbon solvent with good results. Solvents which can be used are the hydrocarbon solvents such as n-pentane, isopentane, and the hexanes, heptanes, octanes, decanes, cyclopentane, alkyl substituted cyclopentanes such as methyl cyclopentane, cyclohexane, alkyl substituted cyclohexanes such as methyl cyclohexane, decahydronaphthalene, and homologues and mixtures thereof. Such hydrocarbon solvents are effective for dissolving amorphous polypropylene but cause severe swelling of crystalline polypropylene. Anti-solvents which are added to the above-mentioned solvents, in accordance with the invention, are polar compounds such as alcohols, mercaptans, ketones and aldehydes. The anti-solvents used should be miscible with the hydrocarbon solvent in the concentrations used. Suitable anti-solvents include, for example, acetone, diethyl ketone, methyl ethyl ketone, ethyl alcohol, n-propyl alcohol, isopropyl alcohol, the butyl alcohols, ethanethiol, propanethiol, propionaldehyde, butyraldehyde, propionic acid, butyric acid, and homologues thereof, can be used with good results. The amount of anti-solvent employed must be from 0.01 to 0.6 part per part of hydrocarbon solvent, and preferably from 0.15 to 0.4. "Parts" as used herein means parts by volume unless otherwise stated. When the quantity of anti-solvent is below 0.01 part per part of hydrocarbon solvent, the crystalline polypropylene on contact with the resulting mixture of solvent and anti-solvent swells appreciably so that filtration thereof cannot be accomplished. When the quantity of anti-solvent is above 0.6 part per part of hydrocarbon solvent, the amorphous polymer is substantially insoluble in the resulting mixture so that the purposes of the invention are defeated.

The mixture of solvent and anti-solvent can be prepared at any time in the process so long as it is prepared and is in contact with the solid polypropylene prior to the filtration designed to separate the amorphous polymer from the crystalline polymer. For example, when a catalyst deactivant which is also an anti-solvent, as above-described, is employed, a portion thereof can be left with the solid polypropylene such as after separation, by filtration or otherwise, of only a major proportion of the liquid deactivant from the solid polymers. Adding a solvent then provides for the dissolution of the amorphous portion of the polypropylene and subsequent rapid separation such as by filtration, it being only necessary that the ratio of anti-solvent to solvent is within the defined range.

The amount of hydrocarbon solvent to use should be such that, on dissolving the amorphous polymer, the quantity of amorphous polymer dissolved is from about 1% to 25% by weight of the hydrocarbon solvent, and preferably is from about 5% to 20% by weight of the hydrocarbon solvent. While larger quantities of solvent can be used, no appreciable advantage is obtained thereby. When the concentration of the dissolved amorphous polymer is above 25% by weight, the solution becomes so viscous that filtration of the undissolved solid crystalline polypropylene is difficult. Preferably the temperature employed during the mixing of polypropylene with the mixture of solvent and anti-solvent is in the range of from about 15° C. to about 40° C., but temperatures of from about 5° C. to about 70° C. can be used.

The following examples illustrate the process of the invention.

EXAMPLE 1

In order to illustrate the advantages of the process of the invention, a charge stock consisting of a solution of crystalline polypropylene and amorphous polypropylene in a mixture of saturated paraffinic hydrocarbons was prepared at an elevated temperature. The crystalline polypropylene had an average molecular weight of 100,000. The amorphous polymer was obtained by contacting a mixture thereof and crystalline polypropylene with n-pentane at an elevated temperature, separating the n-pentane containing dissolved amorphous polymer, and precipitating the dissolved amorphous polymer from the n-pentane. The mixture of saturated paraffinic hydrocarbons, used as the solvent, had a specific gravity of 0.755, and distilled as follows: initial boiling point=131° C.; 50% point=183° C.; 90% point=213° C.; and end point=267° C.

The charge stock contained 48 g./l. (grams per liter) of crystalline polypropylene and 12 g./l. of amorphous polypropylene, and was cooled from a temperature of about 150° C. to about 66° C. to precipitate the crystalline polymer. Various quantities of acetone were added to different portions of the resulting slurry, and the filtration rates for separating out the solid polymer were determined. The ratio of acetone added to solvent, and the filtration rates obtained therewith, are shown in following Table I:

Table I

| Parts acetone/parts solvent: | Filtration rate (cc./min.) |
|---|---|
| 0 | [1] 0 |
| 0.010 | 13.8 |
| 0.031 | 15.4 |
| 0.040 | 16.0 |
| 0.111 | 19.6 |
| 0.250 | 31.3 |
| 0.429 | 100.0 |

[1] Substantially no filtration was obtained and the rate was too slow to measure.

Repeating the foregoing procedure substituting methanol for acetone, the following results were obtained:

*Table II*

Parts methanol/parts solvent: Filtration rate (cc./min.)
```
0.010 _____ 13.2
0.031 _____ 14.1
0.053 _____ 16.0
```

These data show that the addition of a small amount of an anti-solvent polar material to the slurry substantially increases the filtration rate, and that when the ratio of anti-solvent to solvent is above about 0.15, the filtration rate markedly increases.

EXAMPLE 2

In order to demonstrate maintaining amorphous polypropylene in solution in a solvent admixed with an anti-solvent, amorphous polypropylene was dissolved in a mixture of saturated parafinic hydrocarbons having a boiling range of from about 56° C. to about 162° C. The resulting solution contained 10% by weight of the polymer. Actone was then added until amorphous polymer was precipitated. No precipitate was observed until the mole ratio of acetone to solvent was 0.45. The addition was performed at a temperature of about 20° C. At higher temperatures, precipitation does not occur until a greater quantity of acetone is added.

EXAMPLE 3

In order to further demonstrate the process of the invention, propylene was contacted with a suspension of titanium trichloride in isooctane containing aluminum triethyl. The mole ratio of aluminum triethyl to titanium trichloride was 0.61 and the quantity of titanium trichloride was such that 0.1 gram thereof was present in 100 cc. of isooctane. The temperature during the contacting was maintained at from 78° C. to 79° C. and the pressure was maintained in the range of from 105 to 129 p.s.i.g., the pressure being maintained within this range by periodic addition of propylene to the reactor. After 12.3 hours the reaction was stopped and 1832 grams of solid polymer product recovered. A portion of the solid product (147.3 grams) were admixed with 622 grams of a mixture of saturated hydrocarbons and methanol in equal parts by weight. The mixture of saturated hydrocarbons had a specific gravity of 0.70 and distilled as follows: initial boiling point=56° C.; 50% point=104° C.; 90% point=112° C.; and the end point=162° C. After admixing to form a slurry, the catalyst was deactivated and the solid polymers, including both the crystalline and amorphous polymers, were filtered. The filter cake was reslurried with methanol to remove substantially all of the saturated hydrocarbons from the polypropylene and the methanol was filtered from the solid polymer. The resulting filter cake, which was wet with methanol, was slurried with 500 cc. of n-pentane. The quantity of methanol in the wet cake was such that the mole ratio thereof to the n-pentane was 0.42. The solid polymer remaining was filtered from this slurry. On evaporation of the filtrate there were obtained 19.4 grams of amorphous polypropylene. The filter cake was dried and there were recovered 127.9 grams of crystalline polypropylene substantially free of amorphous polymer.

Repeating the above procedure except that methanol is removed from the filter cake prior to reslurrying the cake with n-pentane, the filtration rate is so slow as to be completely impractical.

The invention claimed is:

1. Process for the preparation of crystalline polypropylene substantially free from amorphous polypropylene which comprises contacting, at a temperature within the range of from about 5° C. to 70° C., a mixture of crystalline and amorphous polypropylene with a mixture of saturated hydrocarbons boiling in the range of 36° C. to 267° C. and with from 0.01 to 0.45 part, based on the hydrocarbons, of a material selected from the group consisting of methanol and acetone, and separating undissolved crystalline polypropylene from the resulting solution.

2. Process according to claim 1 wherein said anti-solvent is acetone.

References Cited in the file of this patent

UNITED STATES PATENTS

| | | |
|---|---|---|
| 2,482,056 | Elwell et al. | Sept. 13, 1949 |
| 2,691,647 | Field et al. | Oct. 12, 1954 |
| 2,825,721 | Hogan et al. | Mar. 4, 1958 |
| 2,904,542 | Fasce et al. | Sept. 15, 1959 |
| 2,905,645 | Anderson et al. | Sept. 22, 1959 |
| 2,918,459 | Nowlin et al. | Dec. 22, 1959 |

FOREIGN PATENTS

| | | |
|---|---|---|
| 526,101 | Italy | May 14, 1955 |

OTHER REFERENCES

"Fraction Action of High Polymers" (Cragg and Hammerschlag), published by Williams and Wilkins Company (Baltimore), 1946 (pages 96–109 relied on).